Sept. 15, 1931.  T. A. LUCY  1,823,551
APPARATUS FOR THE MANUFACTURE OF WELDED STRUCTURES
Filed Sept. 21, 1927  2 Sheets-Sheet 2
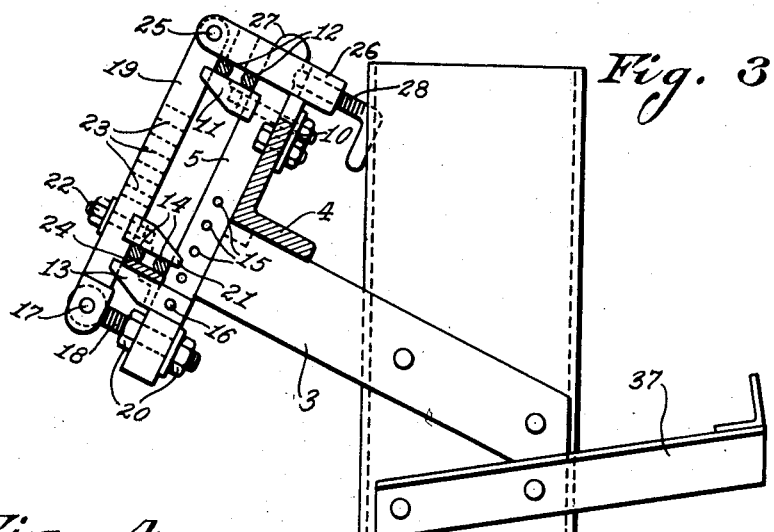
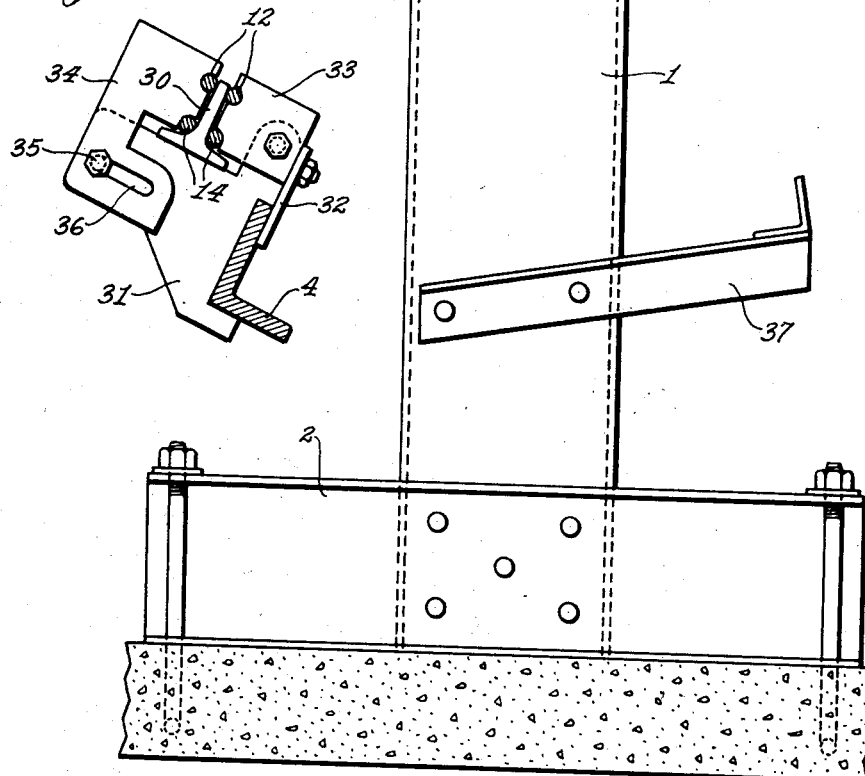
Inventor:
Thomas A. Lucy,
By John N Bruninga
His Attorney.

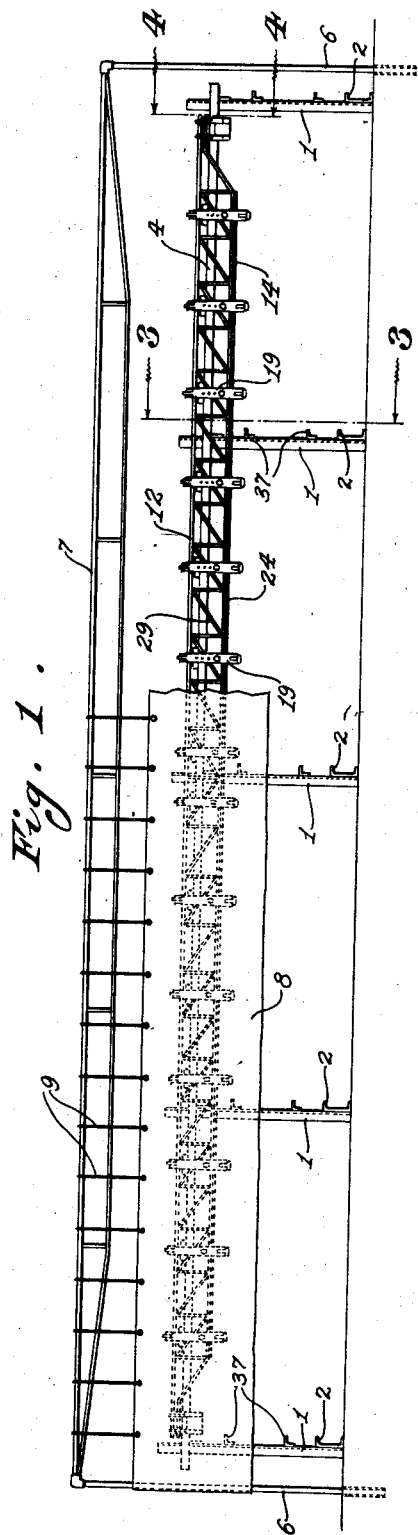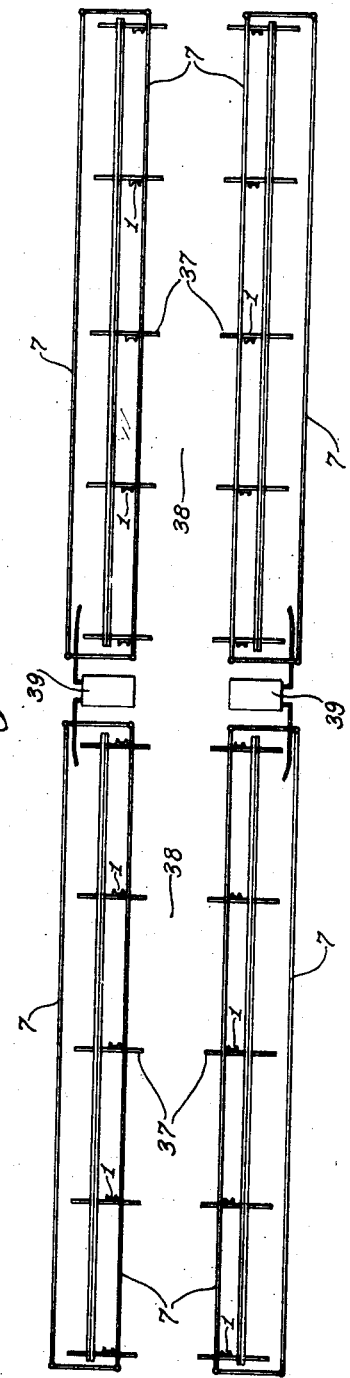

Patented Sept. 15, 1931

1,823,551

UNITED STATES PATENT OFFICE

THOMAS A. LUCY, OF BIRMINGHAM, ALABAMA, ASSIGNOR TO INGALLS STEEL PRODUCTS COMPANY, OF BIRMINGHAM, ALABAMA, A CORPORATION

APPARATUS FOR THE MANUFACTURE OF WELDED STRUCTURES

Application filed September 21, 1927. Serial No. 220,935.

This invention pertains to apparatus for the manufacture of welded structures, such as so-called bar joists. Such a joist consists of a truss formed of steel rods bent into suitable shapes and welded together at certain points. Such a truss contains a large number of welded joints, and the elements of construction must be accurately positioned relatively to one another and securely welded in that position.

The welding operation is usually carried out by means of electric arcs, and as there is usually a large number of welders employed at one time on a given structure, a number of such arcs will be in operation practically all the time during the manufacture of such a structure. The light produced by the electric arc when playing between iron electrodes, as is the case in welding operations of this type, produces a large amount of ultra-violet radiation, which is injurious to the eyes. The welders employed must always wear special masks to screen out this radiation. As the continuous use of such arcs in a shop in which other workmen are employed would endanger the eyes of those other workmen, it is desirable to provide for screening the radiation of the arcs so as to prevent the same from reaching the eyes of those not engaged in the welding operation and who would not have special protection.

One of the objects of this invention, therefore, is to provide means for holding the structural elements of the bar joist during the welding operation and surrounding or enclosing the holding device so as to enclose the operators engaged in welding and prevent the radiation from the arcs spreading through the surrounding space.

Another object is to provide a welding rack with an enclosing booth which will be effective in cutting off the radiation of the arcs and which is of a simple and cheap construction.

Another object is to provide an arrangement of such welding apparatus which will promote economy in the manufacture of such welded structures by placing all of the necessary material and devices in such relation to one another as to involve a minimum expense of time and labor in handling the same.

Another object is to provide a welding rack which will support and hold the structure to be welded with its parts accurately positioned relative to one another and in a manner to be conveniently accessible by the welder.

Another object is to provide improved clamping means for supporting the elements of the welded structure in their proper relative positions.

Further objects will appear from the following description, taken in connection with the accompanying drawings, in which—

Figure 1 is a side view of a welding rack and enclosing booth embodying this invention, part of the curtain being broken away to show the rack;

Figure 2 is a plan view, showing an arrangement of a plurality of welding booths, such as illustrated in Figure 1, in a convenient manner for carrying out manufacturing operations;

Figure 3 is a section on line 3—3 of Figure 1, showing a rack construction; and

Figure 4 is a detail sectional view on line 4—4 of Figure 1.

Referring to the accompanying drawings, 1 designates an upright constructed of channel iron or other suitable material and supported on a concrete or other suitable base. The lower end of the upright 1 has fixed thereto a cross member 2 which may be bolted to the base as indicated in Figure 3. A series of these uprights 1 is arranged in a line, as indicated in Figure 1. Each upright has secured thereto at a suitable angle an arm 3 which supports a girder 4 of angle iron or other suitable material. The uprights 1 are carefully set and the girder 4 is accurately alined so that it will be perfectly true and level throughout its length. Mounted at intervals upon the girder 4 is a series of clamps 5, the details of which will be more fully described hereinafter. These clamps are designed to receive and hold the several elements of the bar joist which are to be welded together. As seen from Figure 1, the structure to be welded is supported at regular intervals throughout its length by these clamps. Accordingly, the parts may be accurately positioned and securely held in position until the welded joints can be formed, and, accordingly, an accurately made and true joist is insured.

Arranged to surround the rack formed by the uprights 1 and the girder 4 is a frame consisting of a series of uprights 6 connected by longitudinal trusses 7. This frame may be constructed of iron pipe or other suitable material so as to be as cheap in its construction as possible. Suspended from the trusses 7 and so as to entirely surround the welding rack is a curtain 8 of canvas or other suitable material suspended by hangers 9 at intervals along the truss 7. The curtain 8 is made deep enough so as to completely hide the welding arcs from view from any of the surrounding positions in the shop in which workmen are liable to operate. The curtain is spaced from the ground so as to permit circulation of air thereunder. The hangers 9 are also arranged to space the curtain from the top of the booth so that the air may circulate above the curtain. When used within an enclosed shop, the top of the booth may be left open. When operations are carried on out-doors, the booth may be roofed over in any suitable manner.

The construction of the welding rack and clamp is shown in Figure 3. The body 5 of the clamp is mounted by means of a clamping plate 10 on the girder 4. The arrangement is such that the clamp may be moved from place to place along the girder so that its location may be adjusted to suit the particular bar joist to be welded. Fixed to the upper part of the body 5 is a support 11 adapted to receive the upper cord members 12 of the bar joist. The body 5 is provided with a slotted hole through which the support 11 is fastened, thus permitting adjustment of the support 11 to accommodate the varying sizes of the upper chord members 12, and fastened by a nut.

Arranged to be secured at different locations along the lower end of the body 5 is a second support 13 adapted to receive the lower cord members 14 of the bar joist. The body 5 is provided with a series of holes by means of which the support 13 may be located in any desired position along the body by inserting a pin 16 through said holes. This permits the adjustment of the clamp to suit different sizes of bar joists which may be operated upon.

Hinged at 17 to a threaded bar 18 is a clamping arm 19. The bar 18 is adjustably secured by means of nuts 20 to the body 5 so that the spacing of the arm 19 from the body may be adjusted. Adjustably mounted on the arm 19 is a clamping abutment 21. This abutment is secured to the arm 19 by means of a bolt and nut connection 22, the bolt being insertable through any one of a series of holes 23 in the arm 19. This provides for adjustment of the abutment 21 to such a position with reference to the support 13 that when the arm 19 is swung upwardly to the position shown in Figure 3, the elements 14 will be clamped between the abutment 21 and the support 13. Previous to placing the element 14 in the clamp, a continuous flat plate 24 is placed in the rack so as to support the elements 14 throughout their length and prevent their sagging between supports. This plate also supports the web member 29 of the bar joist which is placed between the elements 14.

Hinged at 25 to the upper end of the arm 19 is a second clamping abutment 26. This abutment is perforated to receive the reduced end 27 of the body 5, so that the member 26 will swing over this reduced end to the position shown in Fig. 3. A clamping stud 28 is threaded into the end of the abutment 26 and arranged to engage a socket in the end 27 of the body so that, after being swung into place, the abutment 26 may be drawn down to securely clamp the structural elements in position. It will be understood that a web member 29 (see Figure 1) of the bar joist is interposed between the two rows of the upper and lower cord members and is clamped between them by the operation of the clamp. This detail has been omitted from Figure 3 in order to avoid confusion.

Adjustments of supports 11, 13 and 21 permit varying depths of trusses to be made, and adjustments of nuts 20 on threaded bar 18 in unison with threaded clamping stud 28 working in bar 26 permits adjustment in width to accommodate structures of varying widths or thicknesses.

The clamp as a unit mounted as shown permits free circulation of air all around the clamp and the structure to be welded, providing perfect insulation against the heat generated by the arc, and eliminating the necessity of any other insulating method.

At the ends of the bar joist, its depth is reduced and a bearing plate 30 is incorporated therewith. At the ends of the welding rack, therefore, the special clamps, as shown in Figure 4, are used to hold the ends of the bar joist. Each of these clamps consists of a bracket 31 secured by a clamp 32 to the girder 4. On the bracket 31 is removably mounted a stationary clamp member 33 having sockets adapted to receive the upper and lower cord members 12 and 14. A second clamp member 34 is bolted at 35 to the bracket 31. The bolt 35 engages a slot 36 so that by loosening the bolt, the clamp member 34 may be withdrawn so as to release the bar joist.

The upright 1 is provided with a series of inclined rack arms 37 projecting rearwardly therefrom or on the opposite side from the clamp 5. These rack bars are adapted to receive bar stock for use in the manufacture of the welded structure. These are conveniently arranged so that when one structure is completed, the stock may be simply lifted from these racks over the top of the upright 1 and placed in the clamps.

In Figure 2, four booths are shown arranged back to back with an aisle 38 therebetween. Between adjacent booths on each side the welding machine 39 may be placed so as to be convenient to the operators in either booth. This arrangement provides for simple and convenient handling in the manufacturing operation, since the aisle 38 provides convenient means for the movement of men and materials to the booths. The stock may be placed from this aisle onto the racks 37. As the curtain 8 protects this aisle, the workmen handling these materials are not exposed to the radiation of the arcs. The curtain may be hung so as to extend slightly over the racks 37 so that material may be lifted from those racks within the booth and placed in the welding clamps. In this way the material may be placed on the racks and outside the booth, and on account of their inclination will slide down toward the inside.

It will be seen that this invention provides an improved apparatus for handling the moving operations necessary for a welded structure such as a bar joist. A rack is provided which is accurately alined and equipped with a series of clamps for holding the structural elements. When mounted and secured in these clamps, the structure to be welded is held accurately in its proper assembled relation and securely clamped therein. The clamps 5 being supported at an inclination, the structural elements may be laid back upon the inclined portion so that even before clamping these elements, they will maintain their position and there will be no liability of a part falling out of place. After the elements are clamped in position, the entire structure is so held, on account of its inclinations, that all of the joints to be welded, both on the upper and lower cord members, are conveniently accessible to the welder so that the operations thereon can be carried out very rapidly. When the structure is completed, the clamps are opened by unscrewing the stud 28 and throwing the arm 19 forward and down. This leaves the front of the clamp entirely open so that the completed structure may be lifted therefrom and suitably disposed of. The completed structure is lifted down from the front of the rack and may be passed out of the front of the booth, to be disposed of from that point in any suitable manner. Thus, the material may be brought into the booth at the aisle 38, while the finished product is passed out of the booth at the front. There is thus no interference between incoming and outgoing materials, and more rapid operation is, therefore, possible.

While this invention has been described and illustrated as applied to the manufacture of bar joists, it may, of course, with obvious modifications be applied to the manufacture of other similar structures. Furthermore, sub-combinations may be used separately under some circumstances, and such use is contemplated by this invention.

It is further obvious that various changes may be made, in the details of construction, within the scope of the appended claims, without departing from the spirit of this invention. It is, therefore, to be understood that this invention is not limited to the specific details shown and described.

Having thus described the invention, what is claimed is:

1. An apparatus for the manufacture of welded structures, comprising, an elevated elongated rack, clamping means on said rack adapted to hold the parts of the structure in position for welding, and an enclosure for said rack and the work thereon adapted to intercept the light of the welding arc.

2. An apparatus for the manufacture of welded structures, comprising, an elevated elongated rack, clamping means on said rack adapted to hold the parts of the structure in position for welding, a frame adjacent said rack, and a curtain on said frame adapted to intercept the light of the welding arc.

3. An apparatus for the manufacture of welded structures, comprising, a rack, clamping means on said rack adapted to hold the parts of the structure in position for welding, a frame adjacent said rack, and a curtain on said frame extending beyond said rack in all directions but terminating short of the ground, adapted to intercept the light of the welding arc in order to protect the eyes of persons in the neighborhood.

4. An apparatus for the manufacture of welded structures, comprising, a rack, and a series of clamps mounted at an inclination on said rack and at intervals therealong adapted to hold the parts of the structure in an inclined position so as to be accessible for welding.

5. An apparatus for the manufacture of welded structures, comprising, a rack having an inclined support, and a series of clamps mounted at intervals along said support adapted to hold the parts of the structure in an inclined position so as to be accessible for welding.

6. An apparatus for the manufacture of welded structures, comprising, a rack, a series of clamps mounted at intervals along said rack, adapted to hold the joist in upright position, and a supporting bar laid in said clamps adapted to support the joist between clamps.

7. An apparatus for the manufacture of welded structures, comprising, a rack, clamping means on said rack adapted to hold the parts of the structure in position for welding, an enclosure for said rack and the work thereon adapted to intercept the light of the welding arc, and a support for stock on said rack and extending inside and outside of said enclosure.

8. An apparatus for the manufacture of welded structures, comprising, a rack, clamping means on said rack adapted to hold the parts of the structure in position for welding, an enclosure for said rack and the work thereon adapted to intercept the light of the welding arc, and a support for stock on said rack and extending inside and outside of said enclosure and sloping toward the interior thereof.

9. In an apparatus for the manufacture of welded bar joists, a clamp comprising, a base adapted for mounting on a support in upright position, a plurality of abutments adjustably mounted on said base, an arm hinged to the lower part of said base, a plurality of abutments adjustably mounted on said arm and adapted for clamping cooperation with said first abutments on said base, and means for tensioning said arm to clamp a joist.

10. In an apparatus for the manufacture of welded bar joists, a clamp comprising, a base adapted for mounting on a support in upright position, a plurality of abutments adjustably mounted on said base, one of said abutments being adjustable to a series of fixed positions, an arm hinged to the lower part of said base, a plurality of abutments adjustably mounted on said arm and adapted for clamping cooperation with said first abutments on said base, and means for tensioning said arm to clamp a joist.

11. In an apparatus for the manufacture of welded bar joists, a clamp comprising, a base adapted for mounting on a support in upright position, a plurality of abutments adjustably mounted on said base, an arm hinged to the lower part of said base and adjustable to accommodate joists of different widths, a plurality of abutments adjustably mounted on said arm and adapted for clamping cooperation with said first abutments on said base, and means for tensioning said arm to clamp a joist.

12. In an apparatus for the manufacture of welded bar joists, a clamp comprising, a base adapted for mounting on a support in upright position, a lower abutment adjustable to a series of fixed positions on said base, an upper abutment adjustable along said base, an arm hinged to the lower part of said base, a plurality of abutments adjustably mounted on said arm and adapted for clamping cooperation with said first abutments on said base, and means for tensioning said arm to clamp a joist.

13. An apparatus for the manufacture of welded structures, comprising, a rack, and a series of clamps mounted on and spaced along said rack constructed and arranged to support the structure to be welded clear of said rack and so as to permit circulation of air therearound.

14. An apparatus for the manufacture of welded structures, comprising, a rack, and a series of clamps mounted on and spaced along said rack and clamping elements spaced therefrom in order to support the structure to be welded clear of said rack and so as to permit circulation of air therearound.

15. An apparatus for the manufacture of welded structures, comprising, an elevated elongated rack, clamping means on said rack adapted to hold the parts of the structure in position for welding, a frame higher than and surrounding said rack, and a curtain on said frame surrounding said rack adapted to intercept the light from the welding arc.

16. An apparatus for the manufacture of welded structures, comprising, an elevated elongated rack, clamping means on said rack adapted to hold the parts of the structure in position for welding, a frame higher than and surrounding said rack, and a curtain on said frame surrounding said rack and terminating short of the ground adapted to intercept the light from the welding arc.

17. An apparatus for manufacturing welded structures, comprising, an elevated rack, a plurality of clamps on said rack adapted to hold the parts of the structure in a position for welding and at a convenient height, a frame higher than and surrounding said rack, a curtain on said frame adapted to intercept the light of the welding arc, and a support for stock on said rack extending inside and outside of said curtain whereby stock may be placed on said rack from outside of said curtain and removed therefrom from the inside of said curtain.

18. An apparatus for manufacturing welded structures, comprising, an elevated rack, a plurality of clamps on said rack adapted to hold the parts of the structure in a position for welding and at a convenient height, a frame higher than and surrounding said rack, a curtain on said frame adapted to intercept the light of the welding arc, and a support for stock on said rack extending inside and outside of said curtain and sloping toward the inside thereof whereby stock may be placed on said rack from outside of said curtain and removed therefrom from the inside of said curtain.

In testimony whereof I affix my signature this 17th day of September, 1927.

THOMAS A. LUCY.